US010065215B2

(12) United States Patent
Berdelle-Hilge et al.

(10) Patent No.: US 10,065,215 B2
(45) Date of Patent: Sep. 4, 2018

(54) SORTING DEVICE FOR ARTICLES AND METHOD FOR SORTING ARTICLES

(71) Applicant: SIEMENS AKTIENGESELLSCHAFT, Munich (DE)

(72) Inventors: Peter Berdelle-Hilge, Constance (DE); Nikolaus Haselberger, Radolfzell-Markelfingen (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 15/505,698

(22) PCT Filed: Jul. 28, 2015

(86) PCT No.: PCT/EP2015/067277
§ 371 (c)(1),
(2) Date: Feb. 22, 2017

(87) PCT Pub. No.: WO2016/026655
PCT Pub. Date: Feb. 25, 2016

(65) Prior Publication Data
US 2017/0274422 A1 Sep. 28, 2017

(30) Foreign Application Priority Data

Aug. 22, 2014 (DE) .................... 10 2014 216 697

(51) Int. Cl.
*B65G 47/71* (2006.01)
*B65G 47/70* (2006.01)
(Continued)

(52) U.S. Cl.
CPC .............. *B07C 3/08* (2013.01); *B65G 47/503* (2013.01); *B65G 47/681* (2013.01); *B07C 5/36* (2013.01); *B65H 2408/111* (2013.01)

(58) Field of Classification Search
None
See application file for complete search history.

(56) References Cited

U.S. PATENT DOCUMENTS 4,615,446 A 10/1986 Pavie
5,007,521 A * 4/1991 Tanaka ................. B65G 1/1378
198/347.1

(Continued)

FOREIGN PATENT DOCUMENTS

EP 0613730 A2 9/1994
WO 2006056454 A1 6/2006

*Primary Examiner* — Kavel Singh
(74) *Attorney, Agent, or Firm* — Laurence A. Greenberg; Werner H. Stemer; Ralph E. Locher

(57) ABSTRACT

A sorting device for articles has at least two main conveyor lines, each conveying consecutively arranged articles, at least two feeder devices, which respectively feed the articles to one of the main conveyor lines, at least two recognition devices for detecting a sorting destination for each article, a plurality of sorting outlets arranged at the end of each main conveyor line, each assigned to sorting destinations, and to which the articles are transported. The sorting device further has at least two connecting conveyor lines, each branching off the main conveyor lines at branch points, by way of which the articles can be conveyed from one main conveyor line to another main conveyor line. The articles can be temporarily stored in a storage device, which feeds temporarily stored articles to one of the main conveyor lines in the direction of conveyance before at least one of the branch points.

12 Claims, 1 Drawing Sheet

(51) Int. Cl.
*B65G 47/00* (2006.01)
*B65G 47/52* (2006.01)
*B07C 3/08* (2006.01)
*B65G 47/50* (2006.01)
*B65G 47/68* (2006.01)
*B07C 5/36* (2006.01)

(56) References Cited

U.S. PATENT DOCUMENTS 7,777,148 B2    8/2010    Zimmermann
7,886,894 B2 *   2/2011    Schill .................... B21D 51/26
                                                                         198/450

* cited by examiner

SORTING DEVICE FOR ARTICLES AND METHOD FOR SORTING ARTICLES

BACKGROUND OF THE INVENTION

Field of the Invention

The invention relates to a sorting device for articles, comprising at least two main conveyor lines, each conveying consecutively arranged articles in a direction of conveyance, at least two feeder devices which respectively feed the articles to one of the main conveyor lines, at least two recognition devices each arranged in the direction of conveyance downstream of the feeder devices and which detect a sorting destination for each article, a plurality of sorting outlets arranged at the end of each main conveyor line, which are each assigned to sorting destinations and into which the articles are transported according to their sorting destination, at least two connecting conveyor lines, each branching off from the main conveyor lines at branch points and each of which connects two main conveyor lines and by way of which articles can be fed from one main conveyor line to another main conveyor line, and at least one storage device in which articles can be stored temporarily.

The invention furthermore relates to a method for sorting articles, wherein the articles are fed to at least two main conveyor lines, the sorting destinations of the articles are detected in each case, the articles are transported on the main conveyor lines in a direction of conveyance to sorting outlets according to their sorting destination, at least some articles are branched off from the one main conveyor line at a branch point onto a connecting conveyor line and fed to another main conveyor line, and at least some articles are stored temporarily.

A sorting device and a method of the type mentioned above are described for example in U.S. Pat. No. 4,615,446 and are employed in particular for sorting flat articles, such as for example letters and large letters. As a result of using two feeder devices which supply two main conveyor lines, to which different sorting outlets are assigned, it is possible to increase the throughput of the described sorting device. This is advantageous in particular in the case of so-called sorting into delivery route order.

However, in the case of the device described in U.S. Pat. No. 4,615,446 problems may be encountered if too many articles need to be fed from one main conveyor line to another main conveyor line. In fact, if many articles are to be fed by way of the connecting conveyor line to a main conveyor line in whose stream of articles there are however no gaps present, said articles must be stored temporarily until gaps are present to allow merging in. Since the articles are fed in by the feeder devices without presorting, unpredictable uneven distribution instances may occur between the main conveyor lines. The uneven distribution instances are the cause of the stated issues.

SUMMARY OF THE INVENTION

The object of the invention is therefore to provide a sorting device and a method of the type mentioned in the introduction which cope better with instances of uneven distribution.

The object is achieved by the sorting device mentioned in the introduction in that the storage device feeds temporarily stored articles to one of the main conveyor lines upstream of at least one of the branch points.

The object is achieved by the method mentioned in the introduction in that the temporarily stored articles are fed to one of the main conveyor lines upstream of at least one of the branch points.

The inventive solution has the advantage that the temporarily stored articles are stored upstream of the connecting conveyor lines, which means that a larger design of storage device is possible. More space is available in the region of the main conveyor lines than in the region of the connecting conveyor lines.

The inventive solution has the further advantage that the articles can be temporarily stored before reaching the branch point to the connecting conveyor line. The travel time can thus be increased and the processing time for the recognition device to detect the sorting destination can thereby be increased. It thus becomes less likely that articles are assigned to an incorrect main conveyor line on account of an undetected sorting destination. It would not be possible to correctly sort such incorrectly assigned articles and they would need to be ejected and newly fed. This situation should be avoided.

The inventive solution can be further developed by means of advantageous embodiments which are described in the following.

The storage device can thus comprise at least one diverter gate arranged on one of the main conveyor lines, a return line branching off from the main conveyor line at the diverter gate and a return point to the main conveyor line arranged at the end of the return line, wherein the diverter gate is arranged downstream of the return point in the direction of conveyance of the main conveyor line. This has the advantage that articles which are to be stored temporarily are quasi transported back in the opposite direction to the direction of conveyance and reintroduced. This means that a relatively long storage time can be enabled for such an article. The storage device is thereby designed as a type of ring storage in which stored articles circulate at least once.

In order to allow flexible adjustment of the storage of the articles in the storage device at least one transport parameter for the articles on the main conveyor line can be different in comparison with the return line. Such transport parameters can here in particular be the transport speed of the articles and/or a spacing between two successive articles. Since the return line is not part of the main conveyor line, said return line can be provided with a separate drive which can be controlled independently.

Furthermore, the sorting device can comprise a controller which controls the sorting device and creates an adequate gap in the stream of articles on the main conveyor line in order to return an article situated in the storage device. This has the advantage that the articles in the storage device can be satisfactorily reintroduced onto the main conveyor line. The controller can for example briefly stop the corresponding feeder device in order to create the corresponding gap in the main conveyor line.

So as to require as few cost-intensive sorting outlets as possible, the sorting device can be designed in order to sort the articles in at least three sorting passes. Sorting in three sort runs—so-called three-pass sorting using the so-called radix method—has the advantage that fewer sorting outlets are required.

The invention will be explained in the following with reference to the attached drawings and the exemplary embodiment shown therein.

DESCRIPTION OF THE INVENTION

Firstly, the sorting device according to the invention will be described with reference to the exemplary embodiment shown in FIG. 1.

Figure 1:
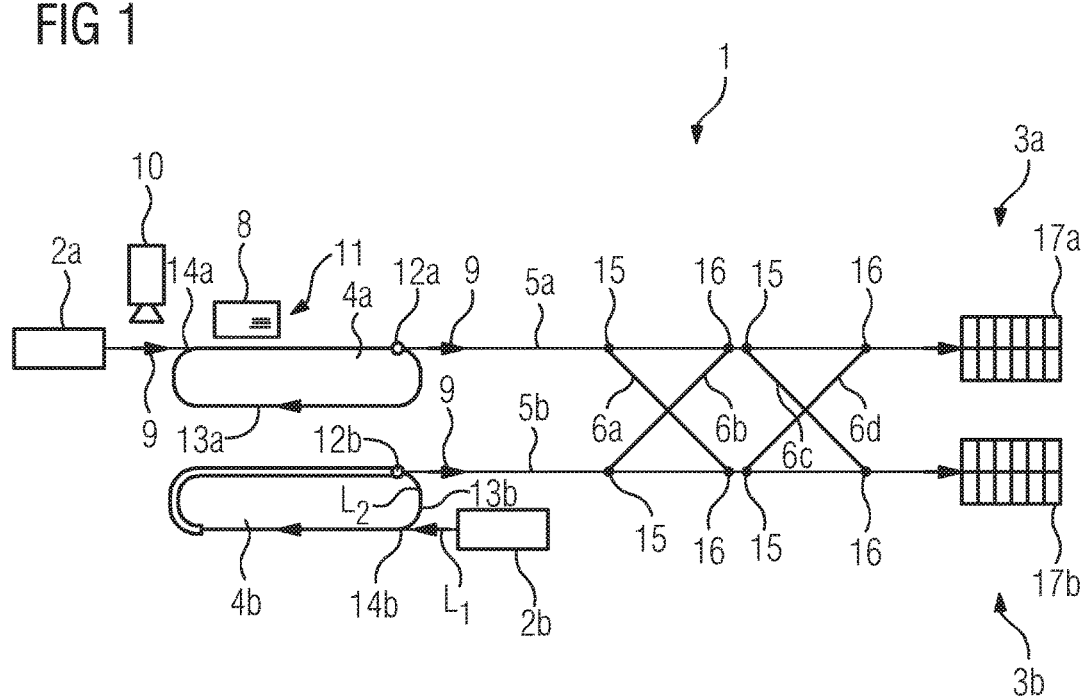
FIG. 1 shows a schematic illustration of a first embodiment of the sorting device according to the invention.

The sorting device 1 shown in FIG. 1 comprises two feeder devices 2a, 2b, a first and a second group of sorting outlets 3a, 3b and two storage devices 4a, 4b. The sorting device 1 furthermore has two main conveyor lines 5a, 5b and a plurality of connecting conveyor lines 6a, 6b, 6c, 6d arranged between the main conveyor lines 5a, 5b, which connect the main conveyor lines 5a, 5b to one another. The sorting device 1 furthermore comprises a controller 7 which controls the sorting device 1 and the components thereof. The components are identified by numbers and letters. The letters serve to differentiate the otherwise identical components of the two main conveyor lines. When the reference characters are used without letters, the components of both main conveyor lines are meant.

The feeder devices 2a, 2b are designed in order to feed articles 8 onto the main conveyor lines 5a, 5b respectively. The articles 8 to be sorted by the sorting device 1 in FIG. 1 are flat postal items, such as for example letters or large letters. The feeder devices 2a, 2b are implemented in a manner known per se and for example separate an inserted batch of articles 8 to produce a stream of articles in which the flat articles 8 are fed successively to the respective main conveyor line 5a, 5b standing on edge and spaced apart from one another.

On the main conveyor line 5 the articles 8 are transported in a direction of conveyance 9 toward the respective group of sorting outlets 3. On the main conveyor line 5 the flat articles 8 standing on edge are normally transported gripped on both sides, for example by endless belts.

The two groups of sorting outlets 3a, 3b at the end of the two main conveyor lines 5a, 5b each have a plurality of sorting outlets 17a, 17b which are assigned to sorting destinations for the articles 8. The sorting outlets 17a, 17b are designed in a known manner for example as stacking compartments in which the articles 8 assigned to the respective sorting outlet 17 are output in stacked fashion.

The sorting device 1 furthermore comprises two recognition devices 10 which are designed in order to detect a sorting destination for each article. The sorting destination 11 is located for example as a recipient address on the article 8. In order to detect the sorting destination 11 a camera (not illustrated) associated with the recognition device 10 produces an image of the article 8 and detects for example by means of OCR technology (optical character reading) the sorting destination 11 from the recipient address. The detected sorting destination 11 is passed to the controller 7 which transports the article 8 to the sorting outlet 17 assigned to the sorting destination. The recognition device 10 is arranged immediately downstream of the feeder device 2 in the direction of conveyance 9.

In the embodiment shown in FIG. 1 the two storage devices 4a, 4b each have a diverter gate 12 arranged in the main conveyor line 5, a return line 13a, 13b and a return point 14a, 14b. The return line 13 runs from the diverter gate 12 as far as the return point 14 likewise arranged in the main conveyor line 5.

The connecting conveyor lines 6 arranged downstream of the storage devices 4 in the direction of conveyance 9 run in each case from a branch point 15 arranged in the main conveyor line 5 to a connecting point 16 in the other respective main conveyor line 5. At the branch point 15 the connecting conveyor lines 6 each have a branching diverter gate (not illustrated), by means of which articles 8 are either left on the main conveyor line 5, or can be branched onto the connecting conveyor line 6, by the controller 7. Furthermore, the connecting conveyor lines 6 may in each case have storage means (not illustrated), by means of which articles 8 on the connecting conveyor line 6 can be stored at least temporarily, as described for example in U.S. Pat. No. 4,615,446.

The function of sorting device 1 according to the invention will be described in the following with reference to the exemplary embodiment shown in FIG. 1.

Unsorted articles 8 are fed from the two feeder devices 2 to the two main conveyor lines 5a, 5b. By this means a stream of articles consisting of articles 8 arranged one behind the other is produced which are conveyed spaced apart from one another in the direction of the groups of sorting outlets 3. When the articles 8 pass the recognition devices 10, the sorting destinations 11 of the articles 8 are then detected and each article 8 is assigned a sorting outlet 17 in one of the two groups of sorting outlets 3a, 3b according to the detected sorting destination 11.

Since different sorting destinations 11 are assigned to the groups of sorting outlets 3a, 3b, it can happen that an article 8 is located on a main conveyor line 5a which does not route said article 8 to the correct group of sorting outlets 3b. In this case the article 8 must be fed to the respective other, correct main conveyor line 5b by way of one of the connecting conveyor lines 6. Said feed is however only possible if a free space is present in the stream of articles on the other main conveyor line 5b. If said free space is not present, because for example all the articles 8 on the main conveyor line 5b are correctly assigned, the article 8 from the main conveyor line 5a cannot initially be fed. In this case one also speaks of an unbalanced load of the system. In this case the article 8, which is intended to be transferred from the main conveyor line 5a onto the main conveyor line 5b, is stored temporarily in the storage device 4a until it can be fed by way of a connecting conveyor line 6 to the main conveyor line 5b.

In order to temporarily store the article 8, the diverter gate 12a is operated by the controller 7 so that the article 8 is diverted onto the return line 13a. At the end of the return line 13a the article 8 is reintroduced onto the main conveyor line 5a at the return point 14a. Since the return point 14 is in each case arranged upstream of the diverter gate 12 in the direction of conveyance 9 on the main conveyor line 5, the article 8 is stored temporarily for a certain storage time in the storage device 4. The storage time depends essentially on the transport speed and the article spacings on the return line 13, which may differ from the transport speed on the main conveyor line 5. The temporarily stored and now returned article 8 can be transferred from the main conveyor line 5a onto the main conveyor line 5b by way of one of the connecting conveyor lines 6a, 6c if a corresponding free space is present on the main conveyor line 6b after the temporary storage. Said free space can have been created in the interim by the controller 7, for example by means of a temporary stoppage of the feeder device 2b or a temporary storage of an article 8 in the storage device 4b.

The storage devices 4 can additionally or alternatively also be utilized for the temporary storage of articles 8 for which it has not yet been possible for the recognition device 10 to detect any sorting destination 11 up to reaching the diverter gate 12. This means that it is unclear for said article 8 as to whether it is assigned to the correct main conveyor line 5. As a result of diverting said article 8 into the storage device 4, the sorting destination 11 can be detected during the storage time and the article 8 can subsequently be transported to the correct group of sorting outlets 3a, 3b. Since the return point 14 of the storage device 4 is in each case arranged upstream of the branch points 15 in the direction of conveyance 9, after the articles 8 have been stored in the storage device 4 a decision can be taken regarding a means of transport required on one of the connecting conveyor lines 6.

A path length $L_1$ from one of the feeder devices 2a, 2b as far as the return point 14a, 14b is designed to be shorter than a path length $L_2$ of the return line 13a, 13b. This has the advantage that the feeder device 2a, 2b can be stopped in order to form a gap when an article has been introduced onto the return line 13a, 13b. Alternatively, storage means would need to be employed on the path $L_2$.

In the following the invention will be described with reference to the further exemplary embodiment of the sorting device 1 in FIG. 2. For the sake of simplicity, only the differences from the sorting device 1 in FIG. 1 will be discussed.

Figure 2:
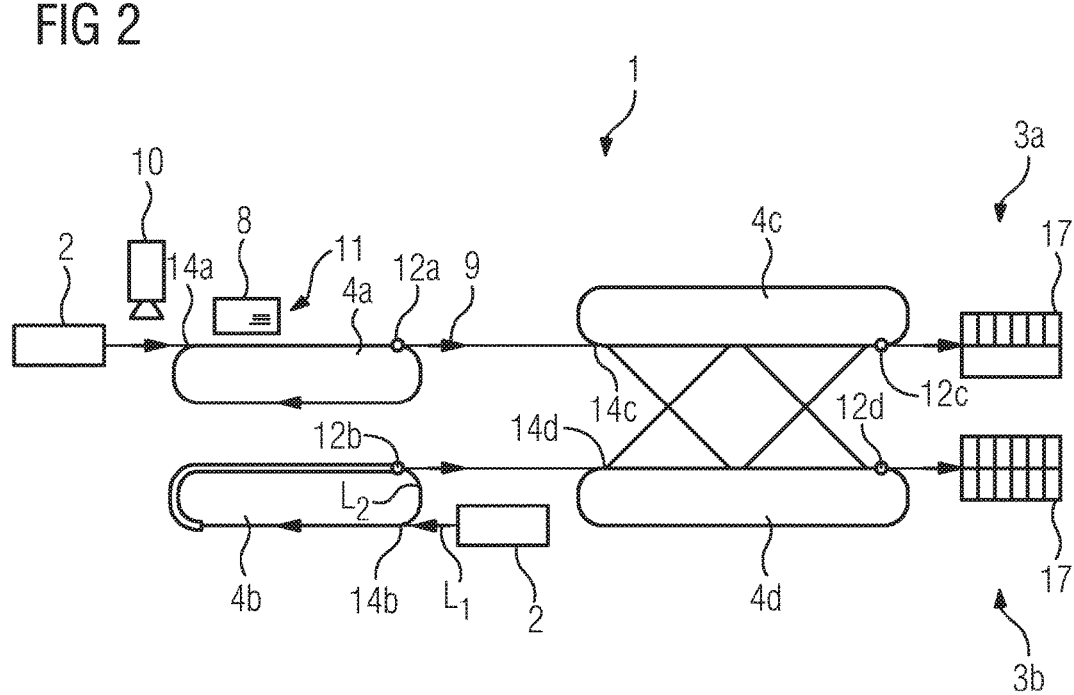
FIG. 2 shows a schematic illustration of a further embodiment of the sorting device according to the invention.

In contrast to the embodiment illustrated in FIG. 1 the sorting device 1 in FIG. 2 comprises two further storage devices 4c, 4d which are arranged downstream of the storage devices 4a, 4b. In this situation the diverter gates 12c, 12d are in each case arranged downstream of the branch points 15 and the connecting points 16 of the connecting conveyor lines 6. The return points 14c, 14d on the other hand are in each case arranged upstream of the branch points 15 and the connecting points 16. Further articles 8 can be stored by means of the additional storage devices 4c, 4d.

As an alternative to the embodiment illustrated in FIG. 2, in an embodiment of the invention not illustrated the storage devices 4a, 4b can be omitted and the sorting device 1 operated only with the storage devices 4c, 4d.

The invention claimed is:

1. A sorting device for articles, the sorting device comprising:
   at least two main conveyor lines, each configured for conveying consecutively arranged articles in a direction of conveyance;
   at least two feeder devices configured to respectively feed the articles to one of said main conveyor lines;
   at least two recognition devices disposed downstream from said feeder devices in the direction of conveyance, and configured to detect a sorting destination for each article;
   a plurality of sorting outlets arranged at an end of each one of said main conveyor lines, said sorting outlets being assigned a given sorting destination each and being disposed for receiving the articles to their sorting destination;
   each of said at least two main conveyor lines defining a direct path from a respective one of said at least two feeders to a respective one of said plurality sorting outlets;
   at least two connecting conveyor lines, each branching off from a respective said main conveyor line at a branch point and each connecting said two main conveyor lines to enable articles to be fed from one said main conveyor line to another said main conveyor line; and
   at least one storage device for temporarily storing articles, said storage device being disposed to feed temporarily stored articles to one of said main conveyor lines upstream of at least one of said branch points in the direction of conveyance.

2. The sorting device according to claim 1, wherein said storage device comprises at least one diverter gate arranged in one of said main conveyor lines, a return line branching off from said main conveyor line at said diverter gate and a return point to said main conveyor line arranged at an end of said return line, and wherein said diverter gate is disposed downstream of said return point in the direction of conveyance of said main conveyor line.

3. The sorting device according to claim 2, wherein at least one transport parameter for the articles on said main conveyor line is different in comparison with said return line.

4. The sorting device according to claim 1, which comprises a controller configured to control the sorting device and generating an adequate gap in a stream of articles on said main conveyor line in order to return an article from said storage device.

5. The sorting device according to claim 1, configured to sort the articles in at least three sorting passes.

6. The sorting device according to claim 1, wherein said main conveyor lines are defined by endless belts.

7. A method for sorting articles, the method comprising:
   feeding the articles to at least two main conveyor lines from a respective feeder for each of said at least two main conveyor lines and acquiring a sorting destination for each article;
   transporting the articles on each of the main conveyor lines in a direction of conveyance to a respective sorting outlet for each of said at least two main conveyor lines in accordance with their sorting destination;
   branching off at least some articles from one main conveyor line at a branch point onto a connecting conveyor line and feeding to another main conveyor line of the said at least two main conveyor lines and to the respective sorting outlet associated therewith; and
   temporarily storing at least some articles and feeding the temporarily stored articles to one of the main conveyor lines upstream of the branch point.

8. The method according to claim 7, which comprises sorting the articles in at least three sorting passes.

9. The method according to claim 7, which comprises providing feeder devices configured to respectively feed the articles to one of the main conveyor lines and at least two recognition devices disposed downstream from the feeder devices in the direction of conveyance, and configured to detect the sorting destination for each article.

10. The method according to claim 7, which comprises providing a plurality of sorting outlets arranged at a end of each one of the main conveyor lines, the sorting outlets being assigned a given sorting destination each and receiving the articles to their sorting destination.

11. The method according to claim 7, which
   comprises providing at least one storage device for temporarily storing articles; and
   feeding temporarily stored articles from the storage device to one of the main conveyor lines upstream of at least one of the branch points in the direction of conveyance.

12. The method according to claim 7, which comprises providing the main conveyor lines as endless belts.

* * * * *